(12) United States Patent
Immonen et al.

(10) Patent No.: US 8,725,193 B2
(45) Date of Patent: May 13, 2014

(54) ADAPTIVE A-MPR IN INTER-BAND CARRIER AGGREGATION

(75) Inventors: Antti O. Immonen, Helsinki (FI); Jouni K. Kaukovuori, Vantaa (FI); Tero M. Henttonen, Espoo (FI)

(73) Assignee: Broadcom Corporation, Irvine, CA (US)

( * ) Notice: Subject to any disclaimer, the term of this patent is extended or adjusted under 35 U.S.C. 154(b) by 365 days.

(21) Appl. No.: 13/288,270

(22) Filed: Nov. 3, 2011

(65) Prior Publication Data
US 2013/0115997 A1    May 9, 2013

(51) Int. Cl.
*H04B 7/00* (2006.01)

(52) U.S. Cl.
USPC ............................... 455/522; 455/68; 455/69

(58) Field of Classification Search
CPC ........................ H04W 52/04; H04W 52/367
USPC ............. 455/522, 67.11, 68–70, 115.3, 126, 455/127.1, 127.2, 135, 226.3, 277.2, 296; 370/318
See application file for complete search history.

(56) References Cited

U.S. PATENT DOCUMENTS

| | | | | |
|---|---|---|---|---|
| 5,729,372 | A * | 3/1998 | Terahara et al. | 398/182 |
| 7,116,726 | B2 * | 10/2006 | Winkler | 375/296 |
| 7,454,176 | B2 * | 11/2008 | Uozumi et al. | 455/84 |
| 7,545,781 | B2 * | 6/2009 | Otsuki et al. | 370/338 |
| 8,138,622 | B2 * | 3/2012 | Layton et al. | 307/3 |
| 8,437,798 | B2 * | 5/2013 | Fabien et al. | 455/552.1 |
| 8,611,837 | B2 * | 12/2013 | Thorson et al. | 455/127.4 |
| 2003/0099286 | A1 * | 5/2003 | Graziano et al. | 375/222 |
| 2007/0019592 | A1 * | 1/2007 | Otsuki | 370/338 |
| 2010/0061480 | A1 * | 3/2010 | Kashiwase et al. | 375/295 |
| 2011/0053624 | A1 * | 3/2011 | Trottier et al. | 455/507 |
| 2011/0081936 | A1 | 4/2011 | Haim et al. | 455/522 |
| 2011/0170637 | A1 * | 7/2011 | Lorenzelli | 375/340 |
| 2011/0199949 | A1 | 8/2011 | Lee et al. | 370/311 |
| 2011/0287804 | A1 * | 11/2011 | Seo et al. | 455/522 |
| 2012/0308039 | A1 * | 12/2012 | Kobayashi et al. | 381/92 |
| 2012/0329515 | A1 * | 12/2012 | Husted et al. | 455/552.1 |
| 2013/0053088 | A1 * | 2/2013 | Thorson et al. | 455/522 |

FOREIGN PATENT DOCUMENTS

| | | |
|---|---|---|
| CN | 102083131 A | 6/2011 |
| WO | 2011/122754 | 10/2011 |
| WO | WO 2011/126203 A1 | 10/2011 |

OTHER PUBLICATIONS

3GPP TS 36.321 V10.2.0 (Jun. 2011), "3rd Generation Partnership Project; Technical specification Group Radio Access Network; Evolved Universal Terrestrial Radio Access (E-UTRA); Medium Access Control (MAC) Protocol Specification (Release 10)", 54 pgs.
3GPP TS 36.101 V10.3.0 (Jun. 2011), "3rd Generation Partnership Project; Technical specification Group Radio Access Network; Evolved Universal Terrestrial Radio Access (E-UTRA); User Equipment (E-UTRA); User Equipment (EU) Radio Transmission and Reception (Release 10)", pp. 1-15 and 30-32 (relevant sections).
R4-114095, 3GPP TSG-RAN WG4 Meeting #60, Athens, Greece, Aug. 22-26, 2011, Motorola Mobility, "Discussion on Inter-Band CA With Harmonic or Intermodulation Relation", (2 pages).

* cited by examiner

*Primary Examiner* — Dominic E Rego
(74) *Attorney, Agent, or Firm* — Stanton IP Law

(57) ABSTRACT

A method to prevent reception interference caused by inter-band CA is described. The method includes receiving instructions to concurrently operate on a first and second band. A first MPR is associated with the first band and a second MPR is associated with the second band. In response to determining that the concurrent operation on the first band and the second band would cause desensitization, a power adjustment is selected. The power adjustment includes a first A-MPR for the first band and/or a second A-MPR for the second band. In response to determining that the device can concurrently operate on the first band and the second band when the power adjustment is applied, the power adjustment is applied. Apparatus and computer readable media are also described.

20 Claims, 7 Drawing Sheets

ADAPTIVE A-MPR IN INTER-BAND CARRIER AGGREGATION

CROSS REFERENCE TO RELATED APPLICATION

This application claims benefit under 35 U.S.C. §119(a) and 37 CFR 1.55 to UK Patent Application 1118847.1, filed on Nov. 1, 2011 and entitled "Adaptive A-MPR in Inter-Band Carrier Aggregation".

TECHNICAL FIELD

The exemplary and non-limiting embodiments of this invention relate generally to wireless communication systems, methods, devices and computer programs and, more specifically, relate to inter-band carrier aggregation.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

1xRTT CDMA2000 1X (IS-2000),
3GPP third generation partnership project
ACLR adjacent channel leakage ratio
A-MPR additional maximum power reduction
BW bandwidth
CA carrier aggregation
CC component carrier
CDMA code division multiple access
CE control element
DL downlink (eNB towards UE)
eNB E-UTRAN Node B (evolved Node B)
E-UTRAN evolved UTRAN (LTE)
IMT-A international mobile telephony-advanced
ITU international telecommunication union
ITU-R ITU radiocommunication sector
LTE long term evolution of UTRAN (E-UTRAN)
LTE-A long term evolution advanced
MAC medium access control (layer 2, L2)
MME mobility management entity
MPR maximum power reduction
NCE network control element
Node B base station
NS network signaling
NW network
PDA personal digital assistant
PHR power head room
P-MPR power management maximum power reduction
RF radio frequency
RTT round trip time
RX receiver
SGW serving gateway
TX transmitter
UE user equipment, such as a mobile station or mobile terminal
UL uplink (UE towards eNB)
UTRAN universal terrestrial radio access network As is specified in 3GPP TR 36.913, LTE-A should operate in spectrum allocations of different sizes, including wider spectrum allocations than those of Rel-8 LTE (e.g., up to 100 MHz) to achieve the peak data rate of 100 Mbit/s for high mobility and 1 Gbit/s for low mobility. It has been agreed that carrier aggregation is to be considered for LTE-A in order to support bandwidths larger than 20 MHz. Carrier aggregation (CA), where two or more component carriers (CCs) are aggregated, is considered for LTE-A in order to support transmission bandwidths larger than 20 MHz. The carrier aggregation could be contiguous or non-contiguous. This technique, as a bandwidth extension, can provide significant gains in terms of peak data rate and cell throughput as compared to non-aggregated operation as in LTE Rel-8.

A LTE-A terminal with reception capability beyond 20 MHz can simultaneously receive transmissions on multiple component carriers. A LTE Rel-8 terminal can receive transmissions on a single component carrier only, provided that the structure of the component carrier follows the Rel-8 specifications. Moreover, it is required that LTE-A should be backwards compatible with Rel-8 LTE in the sense that a Rel-8 LTE terminal should be operable in the LTE-A system, and that a LTE-A terminal should be operable in a Rel-8 LTE system.

FIG. 1 shows an example of the carrier aggregation, where M Rel-8 component carriers are combined together to form M×Rel-8 BW (e.g., 5×20 MHz=100 MHz given M=5). Rel-8 terminals receive/transmit on one component carrier, whereas LTE-A terminals may receive/transmit on multiple component carriers simultaneously to achieve higher throughputs through bandwidths.

With further regard to carrier aggregation, what is implied is that one eNB can effectively contain more than one cell on more than one CC (frequency carrier), and the eNB can utilize one (as in E-UTRAN Rel-8) or more cells (in an aggregated manner) when assigning resources and scheduling the UE.

In current 3GPP LTE specifications there are band-specific network signaling (NS) values for each 3GPP LTE band, e.g., allowed additional maximum power reduction (A-MPR) values. The A-MPR for a band specifies how much power the UE needs to reduce from its maximum in certain conditions, for example, when transmitting on the band. Different NS values and related A-MPR specifications are presented in TS 36.101, Table 6.2.4-1. See further: 3GPP TS 36.101 V10.3.0 (2011 June), "3rd Generation Partnership Project; Technical Specification Group Radio Access Network; Evolved Universal Terrestrial Radio Access (E-UTRA); User Equipment (UE) radio transmission and reception (Release 10)", incorporated by reference herein in its entirety.

These NS values are specified for single-band operation and define the UE behavior in such a way that it can meet 3GPP, regulatory ACLR and spectrum emission requirements. Under the current rules, the NS values are not to be changed if a band is already deployed or is in the process of being deployed. Thus, it is not possible to add any new NS values to a band. In order to introduce a new NS value a new band needs to be defined, which is not a desired option.

Inter-band carrier aggregation (CA) was introduced in Rel-10/11. In inter-band CA, a terminal (e.g., a UE) operates on two or more bands concurrently. However, with certain band combinations some harmonic distortion and intermodulation problems can arise due to the concurrent operation on more than one band. Harmonic and intermodulation components may cause desensitization of a receiver if they hit on top of the receive band. In some inter-band CA cases, the $2^{nd}$ order harmonic and/or $3^{rd}$ order harmonic component of a transmitter hits another receiver band.

FIGS. 2 and 3 illustrates examples of harmonic and intermodulation interference. In FIG. 2, the $3^{rd}$ order harmonic component of a Band17 (B17) transmission hits on Band4 (B4) reception. In FIG. 3, the $3^{rd}$ order intermodulation component of Band13 (B13) and Band5 (B5) transmissions hits on top of the Band13 receiver.

In single band LTE operation, NS band specific NS values may be redefined in such a way that the operation meets requirements. However, operation for Inter-band CA is an evolutionary step from single band operation.

NS values can be signaled to secondary cells (SCells) at handover, as well as to the primary cell (PCell) when carrier aggregation is used. PCell and SCell are conventions referring to specific component carriers in CA. Signaling new NS values for a PCell allows the network to directly alter the NS values an UE is using. However, such techniques place additional burdens on the network and require more overhead for the related signaling.

Another power reduction method is power management maximum power reduction (P-MPR). In P-MPR, a dual mode device (e.g., using 1xRTT and LTE) may drop its UL power so that both radios can still continue to operate. Since the radios are independent of each other, the emission masks might create problems if they operate in certain bands. As an example, the 1xRTT radio could have an ongoing speech call, while the LTE radio would have data transfer. In order to operate both, a P-MPR would be applied. When P-MPR is applied, there is a mechanism in the power head room (PHR) report in Rel-10 wherein the UE indicates (e.g., by a bit) that in the PHR report being sent the UE has reduced maximum power due to P-MPR. This allows the eNB to be aware that a sudden drop in UE maximum UL power is caused by the second radio.

SUMMARY

The below summary section is intended to be merely exemplary and non-limiting.

The foregoing and other problems are overcome, and other advantages are realized, by the use of the exemplary embodiments of this invention.

In a first aspect thereof an exemplary embodiment of this invention provides a method to prevent reception interference caused by inter-band CA. The method includes receiving instructions to concurrently operate on a first band and a second band. A first MPR is associated with the first band and a second MPR is associated with the second band. The method also includes determining whether concurrent operation on the first band and the second band would cause desensitization in at least one receiver band. In response to determining that the concurrent operation on the first band and the second band would cause desensitization, a power adjustment is selected. The power adjustment includes a first A-MPR for the first band and/or a second A-MPR for the second band. The method includes determining whether a device can concurrently operate on the first band and the second band when the power adjustment is applied. In response to determining that the device can concurrently operate on the first band and the second band when the power adjustment is applied, the power adjustment is applied.

In a further aspect thereof an exemplary embodiment of this invention provides an apparatus to prevent reception interference caused by inter-band CA. The apparatus includes at least one processor; and at least one memory including computer program code. The at least one memory and the computer program code are configured to, with the at least one processor, cause the apparatus to perform actions. The actions include to receive instructions to concurrently operate on a first band and a second band. A first MPR is associated with the first band and a second MPR is associated with the second band. The actions also include determining whether concurrent operation on the first band and the second band would cause desensitization in at least one receiver band. In response to determining that the concurrent operation on the first band and the second band would cause desensitization, a power adjustment is selected. The power adjustment includes a first A-MPR for the first band and/or a second A-MPR for the second band. The actions also include determining whether a device can concurrently operate on the first band and the second band when the power adjustment is applied. In response to determining that the device can concurrently operate on the first band and the second band when the power adjustment is applied, the power adjustment is applied.

In an additional aspect thereof an exemplary embodiment of this invention provides a computer readable medium to prevent reception interference caused by inter-band CA. The computer readable medium is tangibly encoded with a computer program executable by a processor to perform actions. The actions include receiving instructions to concurrently operate on a first band and a second band. A first MPR is associated with the first band and a second MPR is associated with the second band. The actions also include determining whether concurrent operation on the first band and the second band would cause desensitization in at least one receiver band. In response to determining that the concurrent operation on the first band and the second band would cause desensitization, a power adjustment is selected. The power adjustment includes a first A-MPR for the first band and/or a second A-MPR for the second band. The actions also include determining whether a device can concurrently operate on the first band and the second band when the power adjustment is applied. In response to determining that the device can concurrently operate on the first band and the second band when the power adjustment is applied, the power adjustment is applied.

In a further aspect thereof an exemplary embodiment of this invention provides an apparatus to prevent reception interference caused by inter-band CA. The apparatus includes means for receiving instructions to concurrently operate on a first band and a second band. A first MPR is associated with the first band and a second MPR is associated with the second band. The apparatus also includes means for determining whether concurrent operation on the first band and the second band would cause desensitization in at least one receiver band. The apparatus also includes means for selecting a power adjustment in response to determining that the concurrent operation on the first band and the second band would cause desensitization. The power adjustment includes a first A-MPR for the first band and/or a second A-MPR for the second band. The apparatus also includes means for determining whether a device can concurrently operate on the first band and the second band when the power adjustment is applied. The apparatus also includes means for applying the power adjustment in response to determining that the device can concurrently operate on the first band and the second band when the power adjustment is applied,

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

In order to solve the harmonic distortion and intermodulation problems, larger A-MPR than those set by the 3GPP NS values may be used for one or more of the operating bands. Various exemplary embodiments in accordance with this invention add additional A-MPR on top of set A-MPR value(s) (e.g., set by 3GPP standards) for either of the operating bands when using inter-band CA. The power adjustment can be done internally in the device without additional network signaling which avoids changes to NS value signaling and avoids creating new NS values (e.g., in a standard).

As used below, "adding A-MPR" means the additional A-MPR is added on top of a conventional A-MPR value (e.g., 3GPP NS-values).

Figure 4:
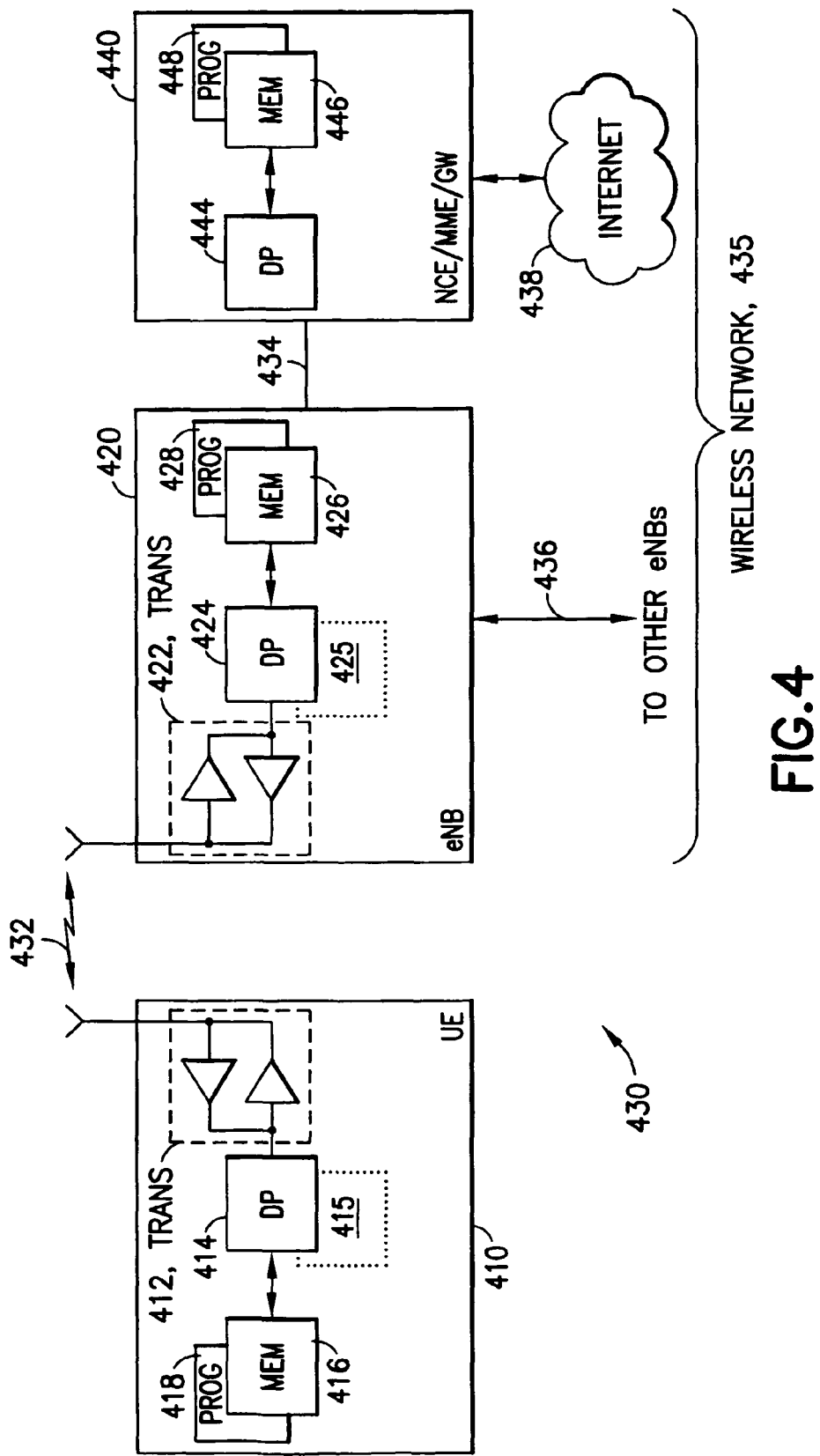
FIG. 4 shows a simplified block diagram of exemplary electronic devices that are suitable for use in practicing various exemplary embodiments of this invention.

Before describing in further detail various exemplary embodiments of this invention, reference is made to FIG. 4 for illustrating a simplified block diagram of various electronic devices and apparatus that are suitable for use in practicing exemplary embodiments of this invention.

Figure 1:
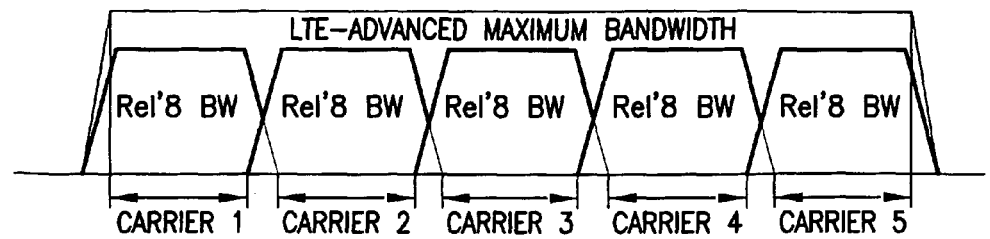
FIG. 1 shows an example of carrier aggregation as proposed for the LTE-A system.
Figure 2:
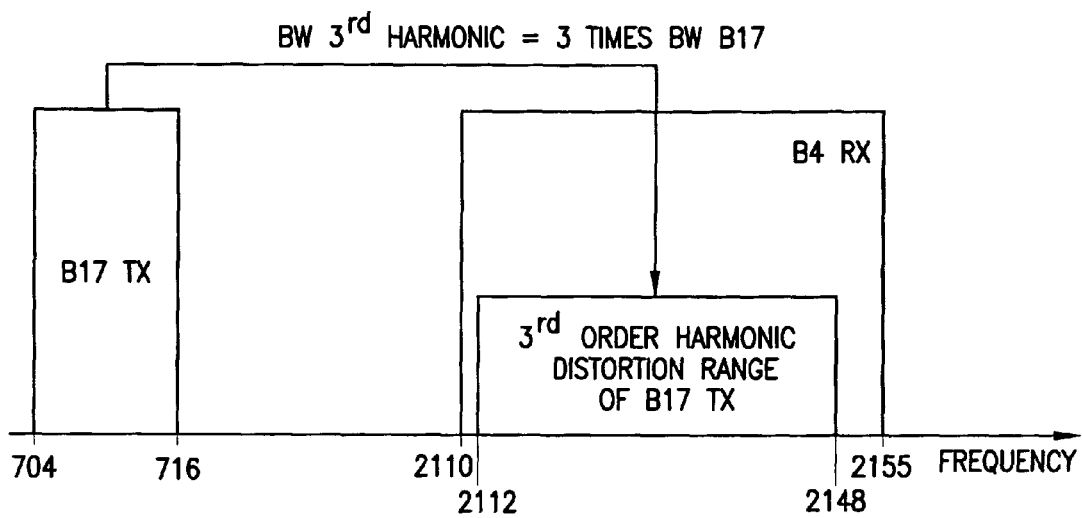
FIGS. 2-3 illustrates examples harmonic and intermodulation interference.
Figure 3:
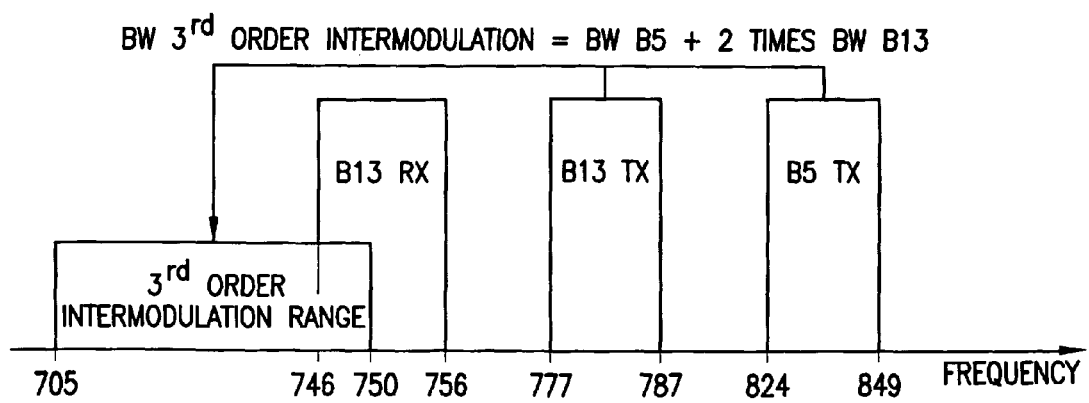

In the wireless system 430 of FIG. 4, a wireless network 435 is adapted for communication over a wireless link 432 with an apparatus, such as a mobile communication device which may be referred to as a UE 410, via a network access node, such as a Node B (base station), and more specifically an eNB 420. The network 435 may include a network control element (NCE) 440 that may include the MME/SGW functionality shown in FIG. 1, and which provides connectivity with a network, such as a telephone network and/or a data communications network (e.g., the internet 438).

The UE 410 includes a controller, such as a computer or a data processor (DP) 414, a computer-readable memory medium embodied as a memory (MEM) 416 that stores a program of computer instructions (PROG) 418, and a suitable wireless interface, such as radio frequency (RF) transceiver 412, for bidirectional wireless communications with the eNB 420 via one or more antennas.

The eNB 420 also includes a controller, such as a computer or a data processor (DP) 424, a computer-readable memory medium embodied as a memory (MEM) 426 that stores a program of computer instructions (PROG) 428, and a suitable wireless interface, such as RF transceiver 422, for communication with the UE 410 via one or more antennas. The eNB 420 is coupled via a data/control path 434 to the NCE 440. The path 434 may be implemented as the S1 interface shown in FIG. 1. The eNB 420 may also be coupled to another eNB via data/control path 436, which may be implemented as the X2 interface shown in FIG. 1.

The NCE 440 includes a controller, such as a computer or a data processor (DP) 444, a computer-readable memory medium embodied as a memory (MEM) 446 that stores a program of computer instructions (PROG) 448.

At least one of the PROGs 418, 428 and 448 is assumed to include program instructions that, when executed by the associated DP, enable the device to operate in accordance with exemplary embodiments of this invention, as will be discussed below in greater detail.

That is, various exemplary embodiments of this invention may be implemented at least in part by computer software executable by the DP 414 of the UE 410; by the DP 424 of the eNB 420; and/or by the DP 444 of the NCE 440, or by hardware, or by a combination of software and hardware (and firmware).

The UE 410 and the eNB 420 may also include dedicated processors, for example CA processor 415 and CA processor 425.

In general, the various embodiments of the UE 410 can include, but are not limited to, cellular telephones, tablets having wireless communication capabilities, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 416, 426 and 446 may be of any type suitable to the local technical environment and may be implemented using any suitable data storage technology, such as semiconductor based memory devices, flash memory, magnetic memory devices and systems, optical memory devices and systems, fixed memory and removable memory. The DPs 414, 424 and 444 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 412 and 422) may be of any type suitable to the local technical environment and may be implemented using any suitable communication technology such as individual transmitters, receivers, transceivers or a combination of such components.

Each 3GPP LTE band has band-specific NS values, for example, allowed A-MPR values. Inter-band CA may not be operated with all desired band combinations using only these NS values. This is due to intermodulation and harmonic products. A UE may be provided with information regarding harmonic and/or intermodulation problems with certain band combination and the required A-MPR to solve the problem. Both harmonic and/or intermodulation problems can be calculated for each supported band combination within a given ranges of operator frequency. This information may be stored in a database or table in the memory of the UE (e.g., MEM 416).

Before the initiation of inter-band CA, a first 3GPP LTE band may be active and operating according to band-specific NS values. When inter-band CA is initiated, a second 3GPP LTE band is activated and operates according to its band-specific NS values. The activation of the second band may be used to launch a trigger event. If a harmonic problem is caused by the activated second band, then the activation of the second band may be the trigger. If a harmonic problem is caused by the first active band (e.g., where the inter-band CA is supposed to use used NS values) then the trigger may be the first active band and the trigger event is launched when the second band is activated. In intermodulation problem cases, the problem is caused by both bands. Their individual contribution to the intermodulation product can be calculated/estimated when the frequencies and power levels are known. In the intermodulation case, the activation of the second band is the trigger.

The addition of A-MPR can be performed in several ways. A first way is to add an additional A-MPR when the second band is first initiated and then, during operation, reduce the added A-MPR if the DL quality of the affected band(s) is sufficient. Alternatively, the UE may simply add the additional A-MPR without automatically making adjustments during operation.

The estimated additional A-MPR value can be computed by using a transmitter output power emission graph, RF bandwidths, reference sensitivities, probing received signal strength estimations before and after launching CA and comparing the received signal strength estimations against received signal quality, etc. A rough value for the extra A-MPR can also be estimated when a $3^{rd}$ order harmonic component power level difference to TX power is known. If the harmonic problems are due to the second band, then the A-MPR of the second band may be increased and the A-MPR of the first band is not changed. If the harmonic problem is due to the first band, then the A-MPR of the first band is increased and the A-MPR of the second band is not changed. Generally, only one of the inter-band CA bands needs the additional A-MPR.

In the intermodulation problem, the A-MPR can be added to either of the bands, or it can be divided between bands by some algorithm. The detection of the need for additional A-MPR could be done internally in the UE, without the need for additional complexity in the network.

Additionally, the UE may send a triggering message to the eNB if the additional A-MPR would push the UE out of the coverage range of the affected band. For example, assuming the UE was already operating at maximum power, it could indicate the adjustment of the A-MPR in the next PHR report or with a separate signaling, e.g., using a MAC control element (CE) message. This would enable the eNB to take appropriate actions, e.g., disable a component carrier to allow more power for UL transmissions.

Power head room (PHR) may also be used to signal to the eNB that the UE is using additional backoff by reusing the P-MPR indication bit. The PHR report could indicate to the eNB that P-MPR is being used, even though the power reduction would be in use due to the operating bands for CA. This would utilize the existing signaling and would allow backward-compatible signaling.

Finally, the UE could also choose to not do the retuning (e.g., by not activating the second band) even though instructed to by the eNB. The UE could reject the configuration and indicate the rejection to the eNB while continuing to use the prior configuration.

Figure 5:
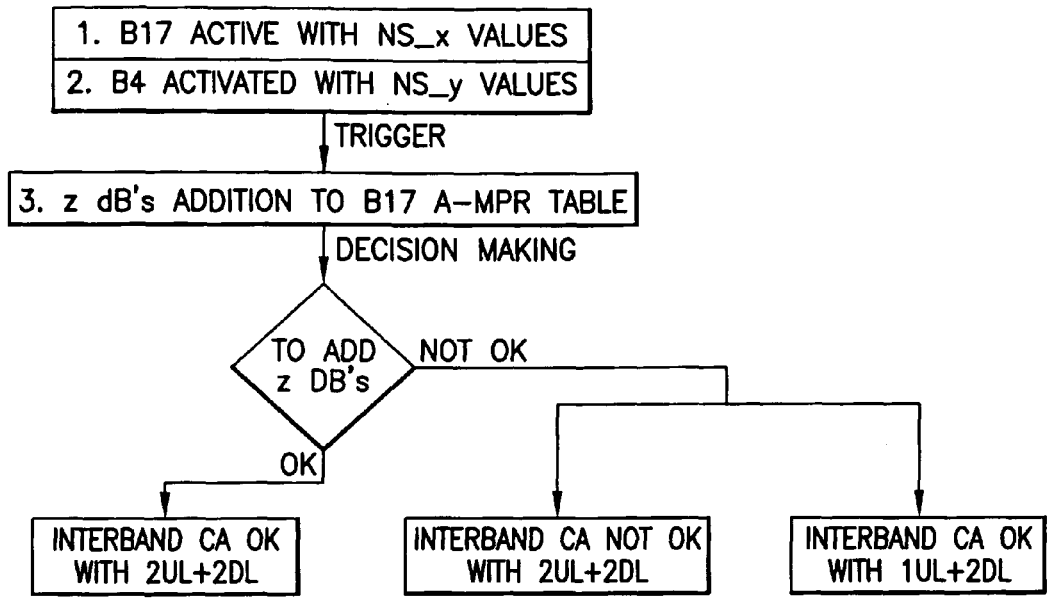
FIGS. 5-6 is a logic flow diagram that each illustrate triggering options for a harmonic problem in accordance with various exemplary embodiments of this invention.
Figure 6:
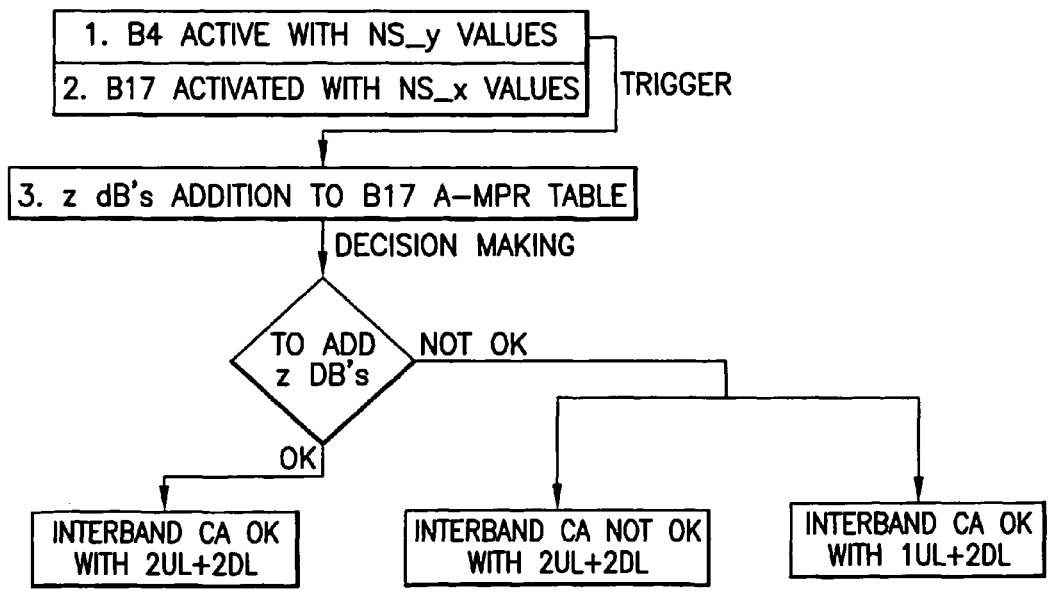

FIGS. 5 and 6 are logic flow diagrams that each illustrate triggering options for a harmonic problem in accordance with various exemplary embodiments of this invention. The method includes the triggering and decision making schemes.

In FIG. 5, the activation of Band4 is used as a trigger to tune the A-MPR of Band17 without changing the NS value. Note that this "z dB" is not necessarily taken from any 3GPP tables; it may be computed by the UE. It is to be added on top of the existing 3GPP A-MPR values. Thus, a new NS is not needed. After the triggering phase is the decision making phase where the device figures out whether it can still operate if the A-MPR is increased by z dB. For instance, if the UE is at the cell edge for Band17, then the extra A-MPR cannot be tolerated since this would cause the UE would drop out from the Band17 cell.

In FIG. 6, the active Band4 acts as a trigger to introduce more A-MPR to Band17 after activation of Band4. In the decision making phase, the UE determines whether it can still operate if the A-MPR is increased by z dB.

If it is not OK to add z dB to the A-MPR, the UE may instead switch from 2UL+2DL inter-band CA to 1UL+2DL inter-band CA (for example, by not transmitting on the band which causes problems in the reception band of the other). In the Band4/Band17 case, the UL would be operated only on Band4. Even with only one UL the use of CA would be advantageous since typically the traffic is asymmetric, e.g., where there is more data in DL than in UL. If the Band17 UL was not used in the inter-band CA, then there naturally would not be harmonic problem.

If the switching to a 1UL+2DL mode is not allowed by the network (NW) the UE can decrease the output power of the "unwanted" UL carrier to its minimum output power level. This can result in the eNB discontinuing transmission on that carrier.

Figure 7:
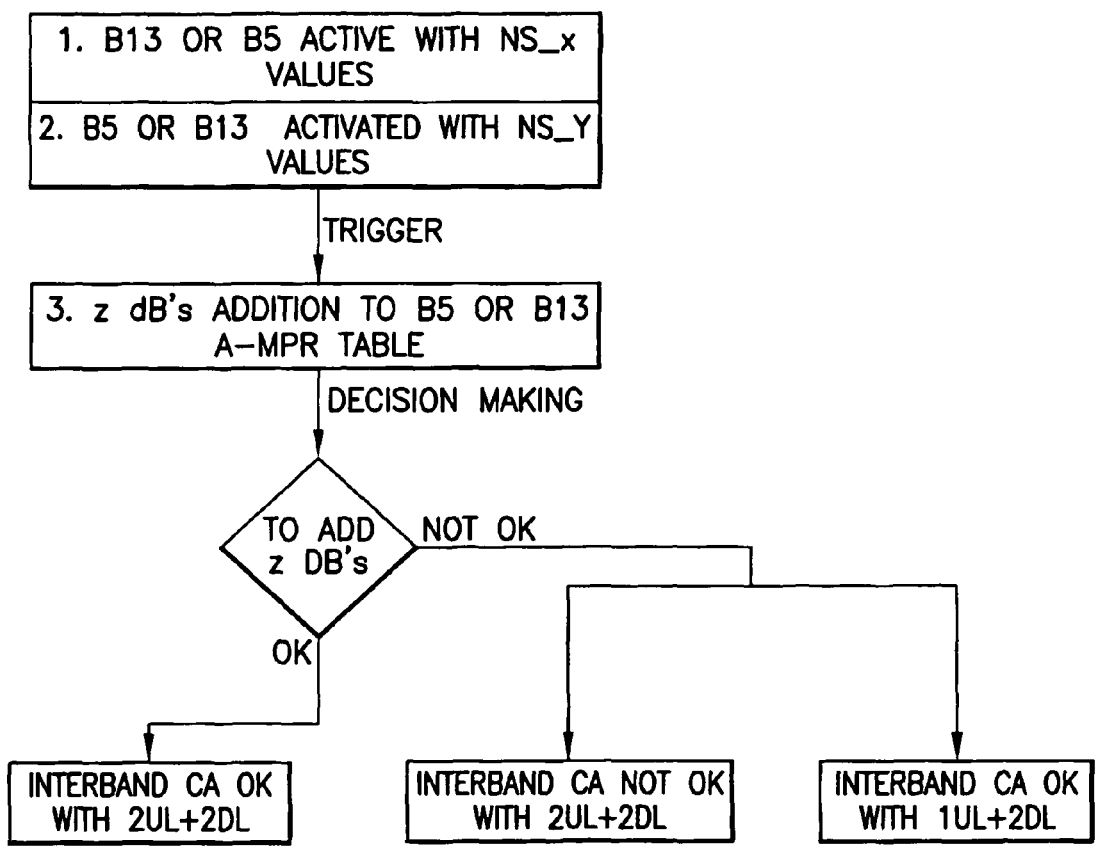
FIG. 7 is a logic flow diagram that illustrates triggering options for an intermodulation problem in accordance with various exemplary embodiments of this invention.

FIG. 7 is a logic flow diagram that illustrates triggering options for an intermodulation problem in accordance with various exemplary embodiments of this invention. Intermodulation is caused by the mixing of two or more uplink features resulting in frequency components which may fall on top of a receiver band. In an intermodulation case, the additional A-MPR can be added to either one of the bands or it can be intelligently split between the bands. The parameters affecting the amount of the contribution to the intermodulation component from one band are at least distance from the victim band (the closer the TX band is the higher the contribution to intermodulation) and TX bandwidth (the wider the BW the higher the contribution to intermodulation). The required amount of A-MPR depends on the position of the aggressor related to a second aggressor and the victim band. For instance, an intelligent split could be done according to an IMD formula. As an example, in case of $3^{rd}$ order intermodulation, the closer aggressor contributes twice the intermodulation power compared to the farther aggressor. Thus, adding A-MPR to the closer aggressor is more effective (and less additional A-MPR needed).

One of the bands may be in a better condition (e.g., farther from the cell edge), where the A-MPR can be more easily added. The device can figure out which of the bands can better tolerate the added A-MPR, e.g., from the PHR reports or RX signal qualities.

Even if no additional signaling to the network side is used, the eNB can still detect the change in the A-MPR from the next normal PHR report, for example, based on values (e.g., $P_{CMAX,c}$) which are included when carrier aggregation is configured.

Figure 8:
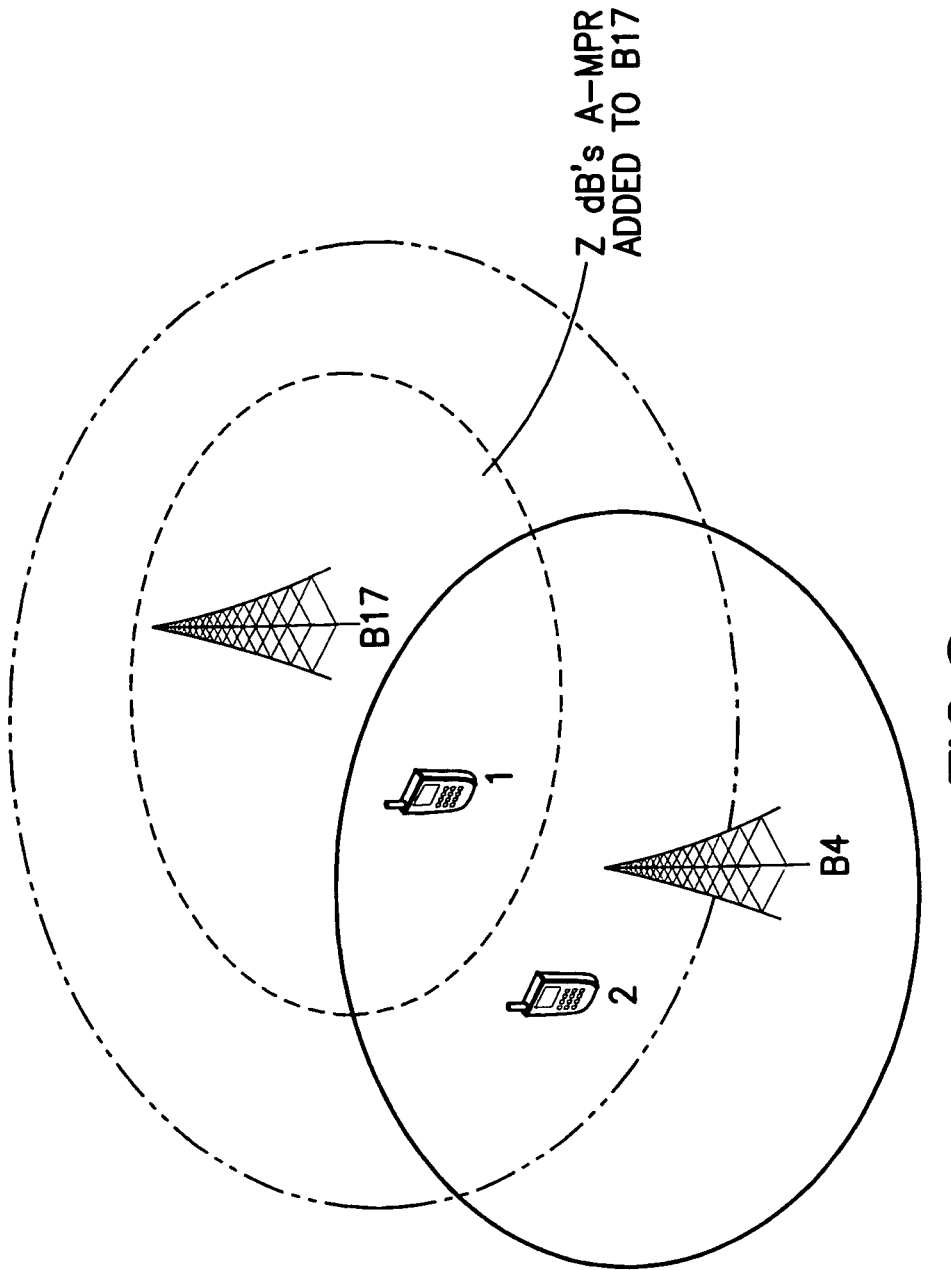
FIG. 8 shows a simplified diagram of a decision making example in a harmonic case in accordance with various exemplary embodiments of this invention.

FIG. 8 shows a simplified diagram of a decision making example in a harmonic case in accordance with various exemplary embodiments of this invention. An example of Band17 and Band4 inter-band CA decision making factors are shown.

Coverage areas of both Band4 and Band17 with 3GPP NS values (A-MPR as specified in 3GPP) are shown as shaded circles. Two cases of UE locations are locations 1 and 2. Adding the desired z dB of extra A-MPR for Band17 in order to mitigate a harmonic problem yields a new coverage area for Band17 marked with dashed line.

If the UE is in location 1, it is possible to add z dB to the A-MPR, because even after the addition the UE is still inside Band17 new coverage area. Thus, inter-band CA is possible with 2UL+2DL if desired. Naturally, 1UL+2DL inter-band CA is also possible If the UE is in location 2, it is not possible to add z dB to the A-MPR, because after the addition the UE would be outside B17 new coverage area. Therefore, inter-band CA is not possible with 2UL+2DL. However, inter-band CA with 1UL+2DL is possible.

Figure 9:
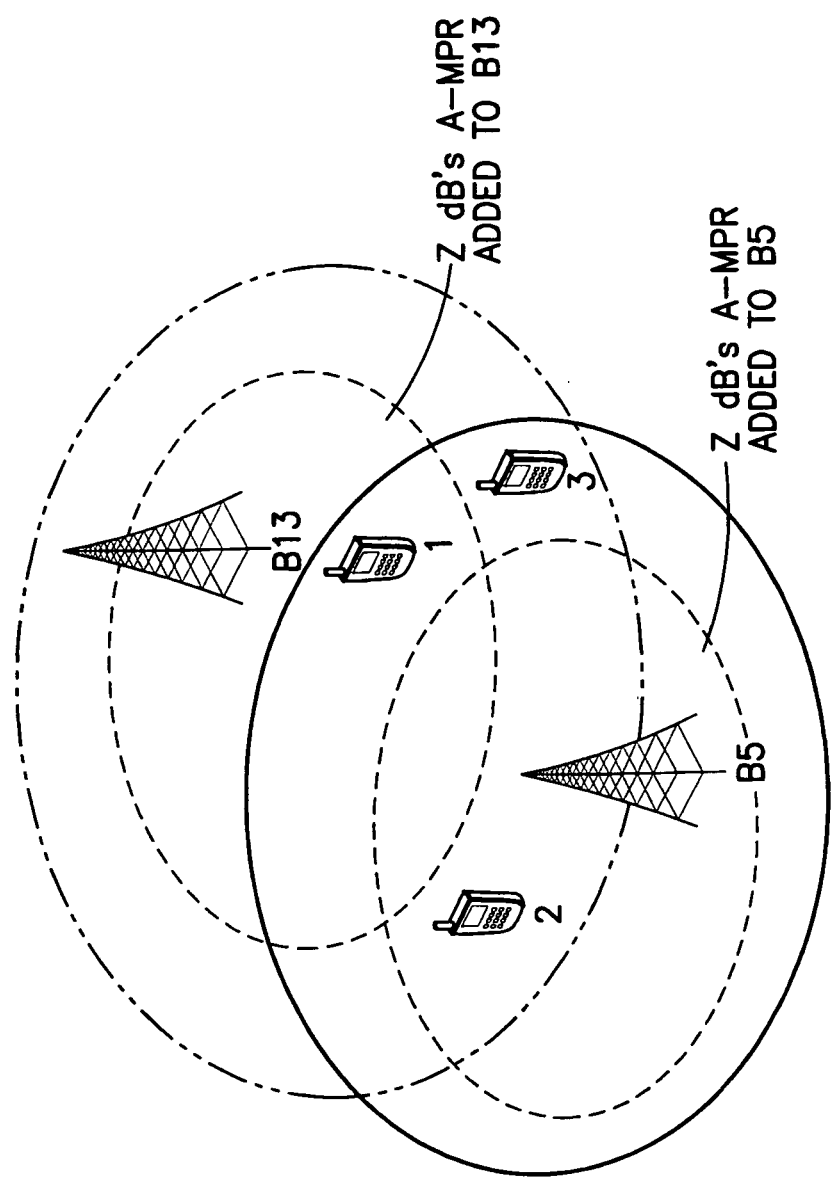
FIG. 9 shows a simplified diagram of a decision making example in an intermodulation case in accordance with various exemplary embodiments of this invention.

FIG. 9 shows a simplified diagram of a decision making example in an intermodulation case in accordance with various exemplary embodiments of this invention. An example of Band13 and Band5 inter-band CA decision making factors are shown. The coverage areas of both Band5 and Band13 with 3GPP NS values (A-MPR as specified in 3GPP) are shown as shaded circles. The UE may be in any of three locations, locations 1, 2 and 3. The applying the desired z dB of extra A-MPR for Band5 and/or Band13 in order to mitigate the harmonic problem alters the coverage area for that band. The adjustment yields new coverage areas for Bands 13 and Band5 marked with dashed lines. The A-MPR may be added to either band. If desired, the A-MPR addition can also be intelligently split between the bands. In this case, both bands may get some added A-MPR.

If the UE is in location 1, it is possible to add z dB to the A-MPR for Band13, because even after the addition the UE is still inside the new coverage area for Band13 and the coverage area for Band5. Thus, inter-band CA is possible with 2UL+2DL if desired. Naturally, 1UL+2DL inter-band CA is also possible Location 2 may be seen as a mirror image of location 1, where the UE would be outside the new coverage area for the other band (Band13 at location 2). If the UE is in location 2, it is possible to add z dB to the A-MPR for Band5, because even after the addition the UE is still inside the new coverage area for Band5 and the coverage area for Band13. Thus, inter-band CA is possible with 2UL+2DL if desired. Again, 1UL+2DL inter-band CA is also possible.

If the UE is in location 3, it is not possible to add z dB to the A-MPR for either band. After such an addition, the UE would be outside the new coverage area of the adjusted band. Therefore, inter-band CA is not possible with 2UL+2DL. However, inter-band CA with 1UL+2DL is still an option.

The UE may also provide signaling to the network in order to inform the network that additional A-MPR is being added. If the P-MPR mechanism is used (and thus, PHR reports are configured for the UE), the P-bit in the PHR report could be set when the additional A-MPR is applied. This would enable the eNB to know that additional power back off is being used. As defined in TS 36.321§6.1.3.6a, the P-bit field indicates whether the UE applies power backoff due to power management. The UE sets P=1 if the corresponding $P_{CMAX,c}$ field would have had a different value if no power backoff due to power management had been applied. See further 3GPP TS 36.321 V10.2.0 (2011 June), "3rd Generation Partnership Project; Technical Specification Group Radio Access Network; Evolved Universal Terrestrial Radio Access (E-UTRA); Medium Access Control (MAC) protocol specification (Release 10)", incorporated by reference herein in its entirety.

When the UE rejects the CA configuration provided by the eNB, the UE may either instruct the eNB of the rejection before the configuration can be used, or the UE may use the configuration first and then instruct the eNB.

In the first case (where the UE rejects the configuration before applying it), the UE can deduce whether the configuration would result in an intolerable MPR. Then, the UE can reject the configuration and indicate the rejection to the eNB. The UE may or may not store the rejected configuration even though it is not applied. If the UE stores the configuration it may wait for an acknowledgement from the eNB before removing the rejected configuration.

In the second case (where the UE applies the configuration before rejecting it), the UE applies the SCell UL configuration and afterwards determines that the desired A-MPR for PCell and/or SCell is excessively large. The UE then indicates this to the eNB. At this point the UE can either immediately begin using a single UL (e.g., the PCell UL used before CA is initiated) or the UE can wait for the eNB to provide a new configuration. The rejected configuration may be retained until the eNB provides a new configuration.

Alternatively, the eNB may, either implicitly (e.g., by not sending message/acknowledgment/reconfiguration to the UE) or explicitly (e.g., by always sending a response to the UE with instructions to keep/override the configuration) override the UE and instruct the UE to use (or continue to use) the rejected configuration. If the rejected configuration is still stored at the UE, the eNB can avoid resending it.

The UE can signal that the configuration is unusable in any one of a number of way. For example, using RRC signaling, a PHR report, MAC CE and/or L1 signaling. RRC signaling may include use of a new field in an existing message, e.g. RRCReconfigurationComplete, that is sent as an acknowledgment to an RRCConnectionReconfiguration message that configures the intra-band Scell UL. A PHR report may also be triggered as a response to the reconfiguration, as indicated above. This would utilize existing mechanisms and require minimal or no changes to existing specifications. A new MAC CE dedicated for this purpose may be introduced in order to indicate that the UE requests a change of the UL configuration. Such a message could also indicate the additional A-MPR the UE is applying.

Based on the foregoing it should be apparent that the exemplary embodiments of this invention provide a method, apparatus and computer program(s) to prevent reception interference caused by inter-band CA.

Figure 10:
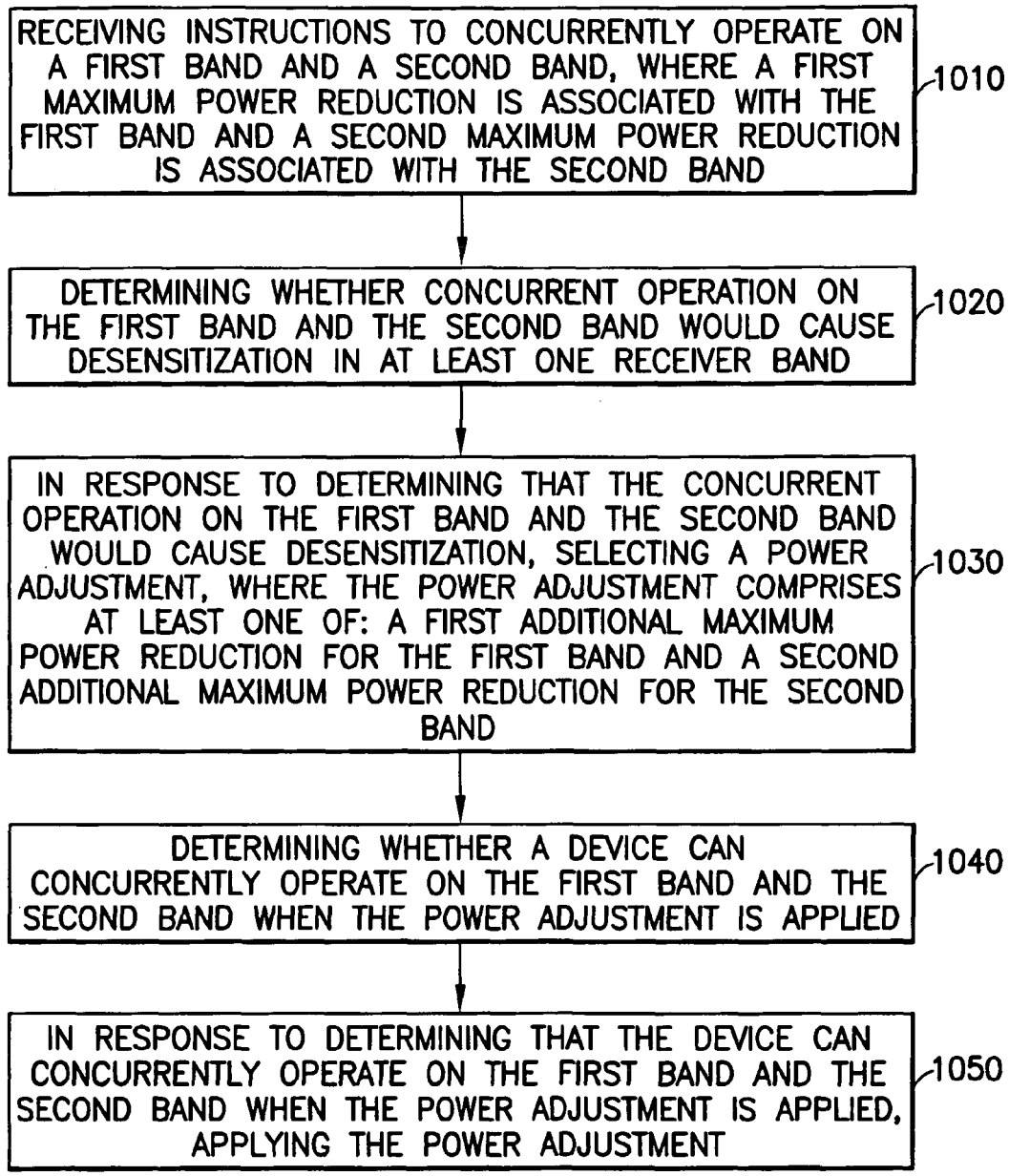
FIG. 10 is a logic flow diagram that illustrates the operation of an exemplary method, and a result of execution of computer program instructions embodied on a computer readable memory, in accordance with various exemplary embodiments of this invention.

FIG. 10 is a logic flow diagram that illustrates the operation of a method, and a result of execution of computer program instructions, in accordance with the exemplary embodiments of this invention. In accordance with these exemplary embodiments a method performs, at Block 1010, a step of receiving instructions to concurrently operate on a first band and a second band. A first maximum power reduction is associated with the first band and a second maximum power reduction is associated with the second band. At Block 1020 is a step of determining whether concurrent operation on the first band and the second band would cause desensitization in at least one receiver band. In response to determining that the concurrent operation would cause desensitization, a step of selecting a power adjustment is performed at Block 1030. The power adjustment includes at least one of: a first A-MPR for the first band and a second A-MPR for the second band. At Block 1040 is a step of determining whether a device can concurrently operate on the first band and the second band when the power adjustment is applied. In response to determining that the device can concurrently operate on the first band and the second band when the power adjustment is applied, at Block 1050 the power adjustment is applied.

The various blocks shown in FIG. 10 may be viewed as method steps, and/or as operations that result from operation of computer program code, and/or as a plurality of coupled logic circuit elements constructed to carry out the associated function(s).

An exemplary embodiment in accordance with this invention is a method to prevent reception interference caused by inter-band CA. The method includes receiving instructions to concurrently operate on a first band and a second band. A first maximum power reduction (MPR) is associated with the first band and a second MPR is associated with the second band. The method also includes determining whether concurrent operation on the first band and the second band would cause desensitization in at least one receiver band. In response to determining that the concurrent operation on the first band and the second band would cause desensitization, a power adjustment is selected. The power adjustment includes a first A-MPR for the first band and/or a second A-MPR for the second band. The method includes determining whether a device can concurrently operate on the first band and the second band when the power adjustment is applied. In response to determining that the device can concurrently operate on the first band and the second band when the power adjustment is applied, the power adjustment is applied.

In a further exemplary embodiment of the method above, the method also includes, in response to determining that the device cannot concurrently operate on the first band and the second band when the power adjustment is applied, switching the device to a one uplink and two downlink mode, decreasing the output power of one of the first band and the second band to a minimum output power level and/or informing a network element that the device cannot concurrently operate on the first band and the second band.

In an additional exemplary embodiment of any one of the methods above, selecting the power adjustment includes selecting a power adjustment based at least in part on the first band and the second band.

In a further exemplary embodiment of any one of the methods above, applying the power adjustment includes adding the first A-MPR on top of the first MPR of the first band and/or adding the second A-MPR on top of the second MPR of the second band.

In an additional exemplary embodiment of any one of the methods above, determining whether the device can concurrently operate on the first band and the second band when the power adjustment is applied includes determining whether applying the power adjustment would cause the device to be outside a coverage area for the first band and/or the second band.

In a further exemplary embodiment of any one of the methods above, determining whether concurrent operation on the first band and the second band would cause desensitization includes determining whether transmission on the first band and/or the second band creates a harmonic interference for reception on the first band and/or the second band.

In an additional exemplary embodiment of any one of the methods above, determining whether concurrent operation on the first band and the second band would cause desensitization includes determining whether transmission on both the first band and the second band creates an inter-modulation interference for reception on the first band and/or the second band.

A further exemplary embodiment in accordance with this invention is an apparatus to prevent reception interference caused by inter-band CA. The apparatus includes at least one processor; and at least one memory including computer program code. The at least one memory and the computer program code are configured to, with the at least one processor, cause the apparatus to perform actions. The actions include to receive instructions to concurrently operate on a first band and a second band. A first MPR is associated with the first band and a second MPR is associated with the second band. The actions also include determining whether concurrent operation on the first band and the second band would cause desensitization in at least one receiver band. In response to determining that the concurrent operation on the first band and the second band would cause desensitization, a power adjustment is selected. The power adjustment includes a first A-MPR for the first band and/or a second A-MPR for the second band. The actions also include determining whether a device can concurrently operate on the first band and the second band when the power adjustment is applied. In response to determining that the device can concurrently operate on the first band and the second band when the power adjustment is applied, the power adjustment is applied.

In an additional exemplary embodiment of the apparatus above, the actions also include, in response to determining that the device cannot concurrently operate on the first band and the second band when the power adjustment is applied, switching the device to a one uplink and two downlink mode, decreasing the output power of one of the first band and the second band to a minimum output power level and/or informing a network element that the device cannot concurrently operate on the first band and the second band.

In a further exemplary embodiment of any one of the apparatus above, selecting the power adjustment includes selecting a power adjustment based at least in part on the first band and the second band.

In an additional exemplary embodiment of any one of the apparatus above, applying the power adjustment includes adding the first A-MPR on top of the first MPR of the first band and/or adding the second A-MPR on top of the second MPR of the second band.

In a further exemplary embodiment of any one of the apparatus above, determining whether the device can concurrently operate on the first band and the second band when the power adjustment is applied includes determining whether applying the power adjustment would cause the device to be outside a coverage area for the first band and/or the second band.

In an additional exemplary embodiment of any one of the apparatus above, determining whether concurrent operation on the first band and the second band would cause desensitization includes determining whether transmission on the first band and/or the second band creates a harmonic interference for reception on the first band and/or the second band.

In a further exemplary embodiment of any one of the apparatus above, determining whether concurrent operation on the first band and the second band would cause desensitization includes determining whether transmission on both the first band and the second band creates an inter-modulation interference for reception on the first band and/or the second band.

In an additional exemplary embodiment of any one of the apparatus above, the apparatus is embodied in an integrated circuit.

In a further exemplary embodiment of any one of the apparatus above, the apparatus is embodied in a mobile device.

An additional exemplary embodiment in accordance with this invention is a computer readable medium to prevent reception interference caused by inter-band CA. The computer readable medium is tangibly encoded with a computer program executable by a processor to perform actions. The actions include receiving instructions to concurrently operate on a first band and a second band. A first MPR is associated with the first band and a second MPR is associated with the second band. The actions also include determining whether concurrent operation on the first band and the second band would cause desensitization in at least one receiver band. In response to determining that the concurrent operation on the first band and the second band would cause desensitization, a power adjustment is selected. The power adjustment includes a first A-MPR for the first band and/or a second A-MPR for the second band. The actions also include determining whether a device can concurrently operate on the first band and the second band when the power adjustment is applied. In response to determining that the device can concurrently operate on the first band and the second band when the power adjustment is applied, the power adjustment is applied.

In a further exemplary embodiment of the computer readable medium above, the actions also include, in response to determining that the device cannot concurrently operate on the first band and the second band when the power adjustment is applied, switching the device to a one uplink and two downlink mode, decreasing the output power of one of the first band and the second band to a minimum output power level and/or informing a network element that the device cannot concurrently operate on the first band and the second band.

In an additional exemplary embodiment of any one of the computer readable media above, selecting the power adjustment includes selecting a power adjustment based at least in part on the first band and the second band.

In a further exemplary embodiment of any one of the computer readable media above, applying the power adjustment includes adding the first A-MPR on top of the first MPR of the first band and/or adding the second A-MPR on top of the second MPR of the second band.

In an additional exemplary embodiment of any one of the computer readable media above, determining whether the device can concurrently operate on the first band and the second band when the power adjustment is applied includes determining whether applying the power adjustment would cause the device to be outside a coverage area for the first band and/or the second band.

In a further exemplary embodiment of any one of the computer readable media above, determining whether concurrent operation on the first band and the second band would cause desensitization includes determining whether transmission on the first band and/or the second band creates a harmonic interference for reception on the first band and/or the second band.

In an additional exemplary embodiment of any one of the computer readable media above, determining whether concurrent operation on the first band and the second band would cause desensitization includes determining whether transmission on both the first band and the second band creates an inter-modulation interference for reception on the first band and/or the second band.

In a further exemplary embodiment of any one of the computer readable media above, the computer readable media is a non-transitory computer readable media (e.g., CD-ROM, RAM, flash memory, magnetic strip memory, etc.).

An additional exemplary embodiment in accordance with this invention is an apparatus to prevent reception interference caused by inter-band CA. The apparatus includes means for receiving instructions to concurrently operate on a first band and a second band. A first MPR is associated with the first band and a second MPR is associated with the second band. The apparatus also includes means for determining whether concurrent operation on the first band and the second band would cause desensitization in at least one receiver band. The apparatus also includes means for selecting a power adjustment in response to determining that the concurrent operation on the first band and the second band would cause desensitization. The power adjustment includes a first A-MPR for the first band and/or a second A-MPR for the second band. The apparatus also includes means for determining whether a device can concurrently operate on the first band and the second band when the power adjustment is applied. The apparatus also includes means for applying the power adjustment in response to determining that the device can concurrently operate on the first band and the second band when the power adjustment is applied.

In a further exemplary embodiment of the apparatus above, the apparatus also includes, in response to determining that the device cannot concurrently operate on the first band and the second band when the power adjustment is applied, means for switching the device to a one uplink and two downlink mode, means for decreasing the output power of one of the first band and the second band to a minimum output power level and/or means for informing a network element that the device cannot concurrently operate on the first band and the second band.

In an additional exemplary embodiment of any one of the apparatus above, the power adjustment selecting means includes means for selecting a power adjustment based at least in part on the first band and the second band.

In a further exemplary embodiment of any one of the apparatus above, the power adjustment applying means includes means for adding the first A-MPR on top of the first MPR of the first band and/or means for adding the second A-MPR on top of the second MPR of the second band.

In an additional exemplary embodiment of any one of the apparatus above, the means for determining whether the device can concurrently operate on the first band and the second band when the power adjustment is applied includes means for determining whether applying the power adjustment would cause the device to be outside a coverage area for the first band and/or the second band.

In a further exemplary embodiment of any one of the apparatus above, the means for determining whether concurrent operation on the first band and the second band would cause desensitization includes means for determining whether transmission on the first band and/or the second band creates a harmonic interference for reception on the first band and/or the second band.

In an additional exemplary embodiment of any one of the apparatus above, the means for determining whether concurrent operation on the first band and the second band would cause desensitization includes means for determining whether transmission on both the first band and the second band creates an inter-modulation interference for reception on the first band and/or the second band.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems such as for example (WLAN, UTRAN, GSM as appropriate).

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., A-MPR, etc.) are not intended to be limiting in any respect, as these parameters may be identified by any suitable names. Further, the various names assigned to different channels (e.g., Band17, Band4, etc.) are not intended to be limiting in any respect, as these various channels may be identified by any suitable names Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   receiving instructions to concurrently operate on a first band and a second band, where a first maximum power reduction is associated with the first band and a second maximum power reduction is associated with the second band;
   determining whether concurrent operation on the first band and the second band would cause desensitization in at least one receiver band;
   in response to determining that the concurrent operation on the first band and the second band would cause desensitization, selecting a power adjustment, where the power adjustment comprises at least one of: a first additional maximum power reduction for the first band and a second additional maximum power reduction for the second band;
   determining whether a device can concurrently operate on the first band and the second band when the power adjustment is applied; and
   in response to determining that the device can concurrently operate on the first band and the second band when the power adjustment is applied, applying the power adjustment.

2. The method of claim 1, further comprising in response to determining that the device cannot concurrently operate on the first band and the second band when the power adjustment is applied, performing at least one of:
   switching the device to a one uplink and two downlink mode,
   decreasing the output power of one of the first band and the second band to a minimum output power level and
   informing a network element that the device cannot concurrently operate on the first band and the second band.

3. The method of claim 1, where selecting the power adjustment comprises selecting a power adjustment based at least in part on the first band and the second band.

4. The method of claim 1, where applying the power adjustment comprises at least one of:
   adding the first additional maximum power reduction on top of the first maximum power reduction of the first band and
   adding the second additional maximum power reduction on top of the second maximum power reduction of the second band.

5. The method of claim 1, where determining whether the device can concurrently operate on the first band and the second band when the power adjustment is applied comprises determining whether applying the power adjustment would cause the device to be outside a coverage area for at least one of: the first band and the second band.

6. The method of claim 1, where determining whether concurrent operation on the first band and the second band would cause desensitization comprises determining whether transmission on one of the first band and the second band creates a harmonic interference for reception on at least one of the first band and the second band.

7. The method of claim 1, where determining whether concurrent operation on the first band and the second band would cause desensitization comprises determining whether transmission on both the first band and the second band creates an inter-modulation interference for reception on at least one of the first band and the second band.

8. An apparatus, comprising at least one processor; and at least one memory including computer program code, the at least one memory and the computer program code configured to, with the at least one processor, cause the apparatus to perform at least the following:
   to receive instructions to concurrently operate on a first band and a second band, where a first maximum power reduction is associated with the first band and a second maximum power reduction is associated with the second band;
   to determine whether concurrent operation on the first band and the second band would cause desensitization in at least one receiver band;

in response to determining that the concurrent operation on the first band and the second band would cause desensitization, to select a power adjustment, where the power adjustment comprises at least one of: a first additional maximum power reduction for the first band and a second additional maximum power reduction for the second band;

to determine whether a device can concurrently operate on the first band and the second band when the power adjustment is applied; and in response to determining that the device can concurrently operate on the first band and the second band when the power adjustment is applied, to apply the power adjustment.

9. The apparatus of claim 8, where the at least one memory and the computer program code are further configured to cause the apparatus, in response to determining that the device cannot concurrently operate on the first band and the second band when the power adjustment is applied, to perform at least one of:

switching the device to a one uplink and two downlink mode, decreasing the output power of one of the first band and the second band to a minimum output power level and informing a network element that the device cannot concurrently operate on the first band and the second band.

10. The apparatus of claim 8, where selecting the power adjustment comprises selecting a power adjustment based at least in part on the first band and the second band.

11. The apparatus of claim 8, where applying the power adjustment comprises at least one of:

adding the first additional maximum power reduction on top of the first maximum power reduction of the first band and adding the second additional maximum power reduction on top of the second maximum power reduction of the second band.

12. The apparatus of claim 8, where determining whether the device can concurrently operate on the first band and the second band when the power adjustment is applied comprises determining whether applying the power adjustment would cause the device to be outside a coverage area for at least one of: the first band and the second band.

13. The apparatus of claim 8, where determining whether concurrent operation on the first band and the second band would cause desensitization comprises determining whether transmission on one of the first band and the second band creates one of: a harmonic interference and an inter-modulation interference for reception on at least one of one of the first band and the second band for reception.

14. A computer readable medium tangibly encoded with a computer program executable by a processor to perform actions comprising:

receiving instructions to concurrently operate on a first band and a second band, where a first maximum power reduction is associated with the first band and a second maximum power reduction is associated with the second band;

determining whether concurrent operation on the first band and the second band would cause desensitization in at least one receiver band;

in response to determining that the concurrent operation on the first band and the second band would cause desensitization, selecting a power adjustment, where the power adjustment comprises at least one of: a first additional maximum power reduction for the first band and a second additional maximum power reduction for the second band;

determining whether a device can concurrently operate on the first band and the second band when the power adjustment is applied; and in response to determining that the device can concurrently operate on the first band and the second band when the power adjustment is applied, applying the power adjustment.

15. The computer readable medium of claim 14, where the actions further comprise in response to determining that the device cannot concurrently operate on the first band and the second band when the power adjustment is applied, performing at least one of:

switching the device to a one uplink and two downlink mode, decreasing the output power of one of the first band and the second band to a minimum output power level and informing a network element that the device cannot concurrently operate on the first band and the second band.

16. The computer readable medium of claim 14, where selecting the power adjustment comprises selecting a power adjustment based at least in part on the first band and the second band.

17. An apparatus comprising:

means for receiving instructions to concurrently operate on a first band and a second band, where a first maximum power reduction is associated with the first band and a second maximum power reduction is associated with the second band;

first means for determining whether concurrent operation on the first band and the second band would cause desensitization in at least one receiver band;

means for selecting a power adjustment in response to determining that the concurrent operation on the first band and the second band would cause desensitization, where the power adjustment comprises at least one of: a first additional maximum power reduction for the first band and a second additional maximum power reduction for the second band;

second means for determining whether a device can concurrently operate on the first band and the second band when the power adjustment is applied; and means for applying the power adjustment in response to determining that the device can concurrently operate on the first band and the second band when the power adjustment is applied.

18. The apparatus of claim 17, further comprising means for performing, in response to determining that the device cannot concurrently operate on the first band and the second band when the power adjustment is applied, at least one of:

switching the apparatus to a one uplink and two downlink mode, decreasing the output power of one of the first band and the second band to a minimum output power level and informing a network element that the device cannot concurrently operate on the first band and the second band.

19. The apparatus of claim 17, where the selecting means comprises means for selecting a power adjustment based at least in part on the first band and the second band.

20. The apparatus of claim 17, where the second determining means comprises means for determining whether applying the power adjustment would cause the device to be outside a coverage area for at least one of: the first band and the second band.

* * * * *

UNITED STATES PATENT AND TRADEMARK OFFICE
CERTIFICATE OF CORRECTION

PATENT NO.         : 8,725,193 B2
APPLICATION NO.    : 13/288270
DATED              : May 13, 2014
INVENTOR(S)        : Antti O. Immonen et al.

It is certified that error appears in the above-identified patent and that said Letters Patent is hereby corrected as shown below:

In the Claims

Column 17, line 51, replace the text "on at least one of one of the first" with --on at least one of the first-- in claim 13.

Signed and Sealed this
Twenty-sixth Day of August, 2014

Michelle K. Lee
*Deputy Director of the United States Patent and Trademark Office*